(12) United States Patent
Seki et al.

(10) Patent No.: US 9,106,164 B2
(45) Date of Patent: Aug. 11, 2015

(54) MOTOR CONTROL DEVICE, IMAGE FORMING APPARATUS INCLUDING THE MOTOR CONTROL DEVICE, AND MOTOR CONTROL METHOD

(71) Applicants: Takeo Seki, Kanagawa (JP); Hiroyuki Kiguchi, Kanagawa (JP); Natsuko Ishizuka, Kanagawa (JP); Takuya Murata, Tokyo (JP)

(72) Inventors: Takeo Seki, Kanagawa (JP); Hiroyuki Kiguchi, Kanagawa (JP); Natsuko Ishizuka, Kanagawa (JP); Takuya Murata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 202 days.

(21) Appl. No.: 13/749,963

(22) Filed: Jan. 25, 2013

(65) Prior Publication Data

US 2013/0200838 A1 Aug. 8, 2013

(30) Foreign Application Priority Data

Feb. 7, 2012 (JP) .................................. 2012-024417

(51) Int. Cl.
*G05D 23/275* (2006.01)
*H02P 8/14* (2006.01)
*H02P 7/29* (2006.01)

(52) U.S. Cl.
CPC .. *H02P 8/14* (2013.01); *H02P 7/29* (2013.01); *H02P 7/2913* (2013.01); *G05B 2219/41428* (2013.01)

(58) Field of Classification Search
CPC ............................................ G05B 2219/41428
USPC ....................................................... 318/632
See application file for complete search history.

(56) References Cited

U.S. PATENT DOCUMENTS

| 5,691,615 | A | 11/1997 | Kato et al. |
| 6,259,221 | B1 * | 7/2001 | Yutkowitz ..................... 318/561 |
| 6,883,318 | B2 * | 4/2005 | Warner et al. ................... 60/602 |
| 7,671,553 | B2 * | 3/2010 | Terada et al. .................. 318/432 |
| 7,986,118 | B2 * | 7/2011 | Yoshikawa ............... 318/568.22 |
| 2012/0268054 | A1 * | 10/2012 | Kishimoto et al. ........... 318/619 |

FOREIGN PATENT DOCUMENTS

| JP | 06083403 A | 3/1994 |
| JP | 08054934 A | 2/1996 |

(Continued)

OTHER PUBLICATIONS

Japanese Office Action dated Feb. 10, 2015 for Japanese patent application No. 2012-024417.

*Primary Examiner* — Erick Glass
(74) *Attorney, Agent, or Firm* — Harness, Dickey & Pierce, P.L.C.

(57) ABSTRACT

A motor control device to execute speed control and position control of motor simultaneously, includes a target position information provider, a target speed information provider, a detected position information detector, a processor to add position feedback information, position feed-forward information, speed feedback information, and speed feed-forward information for output as motor control information, based on the target position information, the setting target speed information, and the detected position speed information, a control voltage generator operatively connected to the processor to generate a control voltage to drive the motor in accordance with the motor control information, and a motor driver operatively connected to the control voltage generator and the motor to control rotation of the motor based on the control voltage.

18 Claims, 10 Drawing Sheets

(56) References Cited

FOREIGN PATENT DOCUMENTS

| JP | 09282008 A | 10/1997 |
| JP | 2003131704 A | 5/2003 |
| JP | 2005-338364 | 12/2005 |
| JP | 2008201500 A | 9/2008 |
| JP | 2011-114951 | 6/2011 |

* cited by examiner

WITHOUT POSITION FF/WITHOUT SPEED FF

WITH POSITION FF/WITH SPEED FF

MOTOR CONTROL DEVICE, IMAGE FORMING APPARATUS INCLUDING THE MOTOR CONTROL DEVICE, AND MOTOR CONTROL METHOD

CROSS-REFERENCE TO RELATED APPLICATION

This patent application is based on and claims priority pursuant to 35 U.S.C. §119 to Japanese Patent Application No. 2012-024417, filed on Feb. 7, 2012 in the Japan Patent Office, the entire disclosure of which is hereby incorporated by reference herein.

BACKGROUND

1. Technical Field

The present disclosure relates to a motor control device, an image forming apparatus including the motor control device, and a motor control method executed by the motor control device.

2. Related Art

In terms of motors used in image forming apparatuses, executing motor speed control and position control accurately is required. Therefore, typically the control method used is switched between speed control and position control and setting gate values are switched depending on the portion in use, when accelerating, when decelerating, or when stopped.

For example, in an image forming apparatus including multiple motors that drive multiple rollers for an image carrier like that proposed in JP-2005-338364-A, a motor control device that executes motor speed control and position control accelerates and decelerates the motor according to predetermined acceleration and deceleration curves when the motor is started or stopped, and switches the gain of a motor control loop to execute speed control or position control of the motor during image formation and at times other than during image formation.

However, the above-described method involving switching the gain of the motor control loop of the motor speed control and the position control depending on the situation necessitates complicated switching, thereby complicating the configuration of the motor control device.

SUMMARY

In one aspect of this disclosure, there is provided a novel motor control device to execute speed control and position control of a motor simultaneously, including a target position information provider, a target speed information provider, a detected position information detector, a processor, a control voltage generator, and a motor driver. The processor adds position feedback information, position feed-forward information, speed feedback information, and speed feed-forward information for output as motor control information, based on target position information, setting target speed information, and detected position speed information. The control voltage generator generates a control voltage to drive the motor in accordance with the motor control information. The motor driver controls rotation of the motor based on the control voltage.

In another aspect of this disclosure, there is provided a novel motor control device to execute speed control and position control of motor simultaneously, including a target position information provider, a detected position information detector, a processor, a control voltage generator, and a motor driver. The processor adds position feedback information, position feed-forward information, and speed feedback information for output as motor control information, based on the target position information and the detected position information. The control voltage generator generates control voltage to drive the motor in accordance with the motor control information. The motor driver to control rotation of the motor based on the control voltage.

In yet another aspect of this disclosure, there is provided a novel control method employing a motor control device that execute speed control and position control of a motor simultaneously. The method includes steps of; inputting target position information; inputting setting target speed information; detecting detected position information; generating position feedback information by calculating a difference between the target position information and the detected position information and multiplying the difference by a constant gain; generating position feed-forward information by differentiating the target position information; generating detected speed information by differentiating the detected position information; generating calculated target speed information by adding the position feedback information and the position feed-forward information; generating speed feedback information by calculating a difference between the calculated target speed information and the detected speed information, and executing proportional-integral-differential control on the difference; generating speed feed-forward information by differentiating the input setting target information; generating a motor control information by adding the speed feedback information and the speed feed-forward information; generating a control voltage to drive the motor in accordance with the motor control information; and controlling rotation of the motor based on the control voltage.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, and particularly to FIGS. 1 through 11, a motor control device according to illustrative embodiments of the present disclosure is described. It is to be noted that, although a DC motor is used as a connected motor as follows, the motor is not limited to a DC motor.

Figure 1:
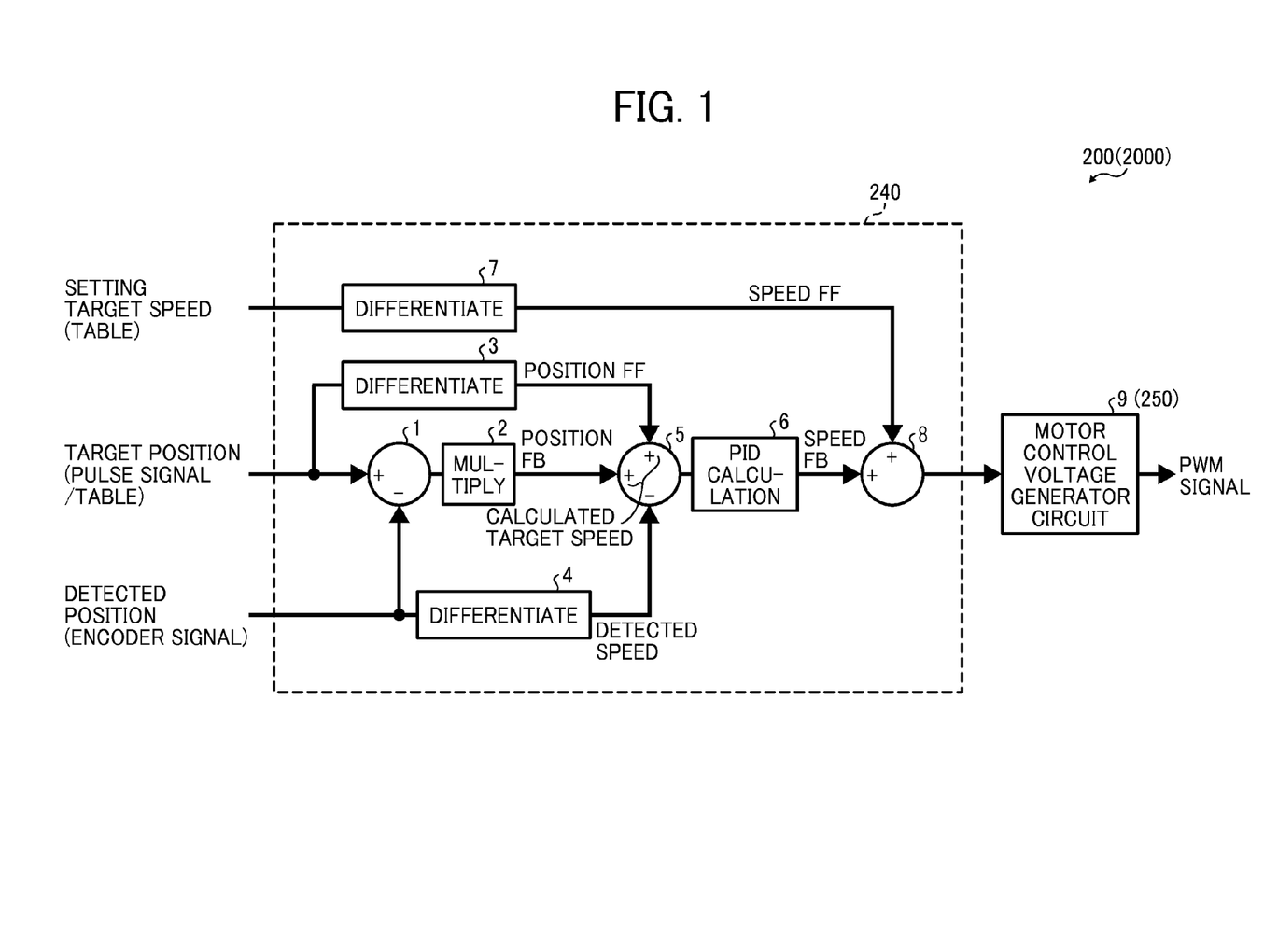
FIG. 1 is a functional block diagram illustrating a configuration of a controller of a motor control device of the present disclosure.

FIG. 1 is a functional block diagram illustrating a configuration of a controller 240 of a motor controller 200 in a motor control device 2000 of a first embodiment. In particular, a feature of the present disclosure is a portion surrounded by a broken line 240 shown in FIG. 1. The controller 240 in the motor controller 200 calculates speed feedback (FB) information as a component of calculated target speed information and generates speed feed-forward (FF) information and outputs a control voltage (PWM signal).

As described below, the controller 240 surrounded by the broken line is implemented by a CPU that runs programs by software control. Alternatively, the controller 240 may be implemented as hardwired logic.

In FIG. 1, a setting target speed of the motor is given by a table. In addition, a target position of the motor is given by the table in the present embodiment. Alternatively, assuming that a control target of the motor control device 2000 is treated as the stepper motor, the target position is given by a pulse signal (pulse rate signal). The actual detected position is obtained by counting the rising edge of the signal (pulse signal) that rotates in sync with an encoder, to be described in detail below with FIG. 5.

The controller 240 functionally includes two comparators 1 and 5, a multiplier 2, three differentiating circuits 3, 4, and 7, a proportional-integral-differential (PID) calculator (controller) 6, and an adder 8. The comparator 1 obtains a difference between the target position of the motor and the detected position to calculate a position deviation. The multiplier 2 multiplies the position deviation by a constant gain (P control), and output position feedback information (position FB). The position FB information is one component of calculated target speed information.

On the other hand, the differentiating circuit 3 differentiates the target position of the motor, and outputs the position forward information (position FF). The position FF information is the other component of the calculated target speed information. By adding the position FF, the position tracking performance can be improved.

The differentiating circuit 4 differentiates the detected position of the motor and outputs the detected speed information. It is to be noted that the detected speed information can be calculated based on the edge interval time of the encoder signal.

The comparator 5 adds the position FB information to the position FF information to generate the calculated target speed information and subtracts the detected speed information from the calculated target speed information to obtain speed deviation. The PID calculation circuit 6 executes PID (P: proportional, I: integral, D, differential) calculation to the speed deviation for outputting the speed feedback information (speed FB). The speed FB information is one component of motor control information.

On the other hand, the differentiating circuit 7 differentiates the setting target speed to output the speed feed forward information (speed FF). The speed FF information is the other component of the motor control information. By adding the speed FF, the speed tracking performance can be improved.

The adder 8 adds the speed FB information and the speed FF information to output the sum to a motor control voltage generator circuit 9 (250) as the motor control information (control error information). The motor control voltage generator circuit 9 generates the control voltage (PWM signal) to drive the DC motor in accordance with the motor control information for controlling a motor drive circuit 300 (see FIG. 5).

With this operation, the motor controller 200 can continuously perform the calculation of adding the position FB, the position FF, the speed FB, and the speed FF without switching the mode. That is, the present configuration can always execute the motor position control and the motor speed control with a high degree of accuracy. In the comparative example, having a certain threshold voltage, the gain and on-off of the position control are switched. By contrast, in the present disclosure, that complex switching becomes unnecessary.

As an alternative configuration (to be described in further detail as a second embodiment), assuming that the stepper motor is set as the control target, the target position is given by the pulse signal (pulse rate signal). At this time, the setting target speed is not given by the table, and the speed FF control is not executed. That is, the speed FB information (position FB+position FF) is directly output to the motor control voltage generator circuit 9 as the motor control information.

Figure 2:
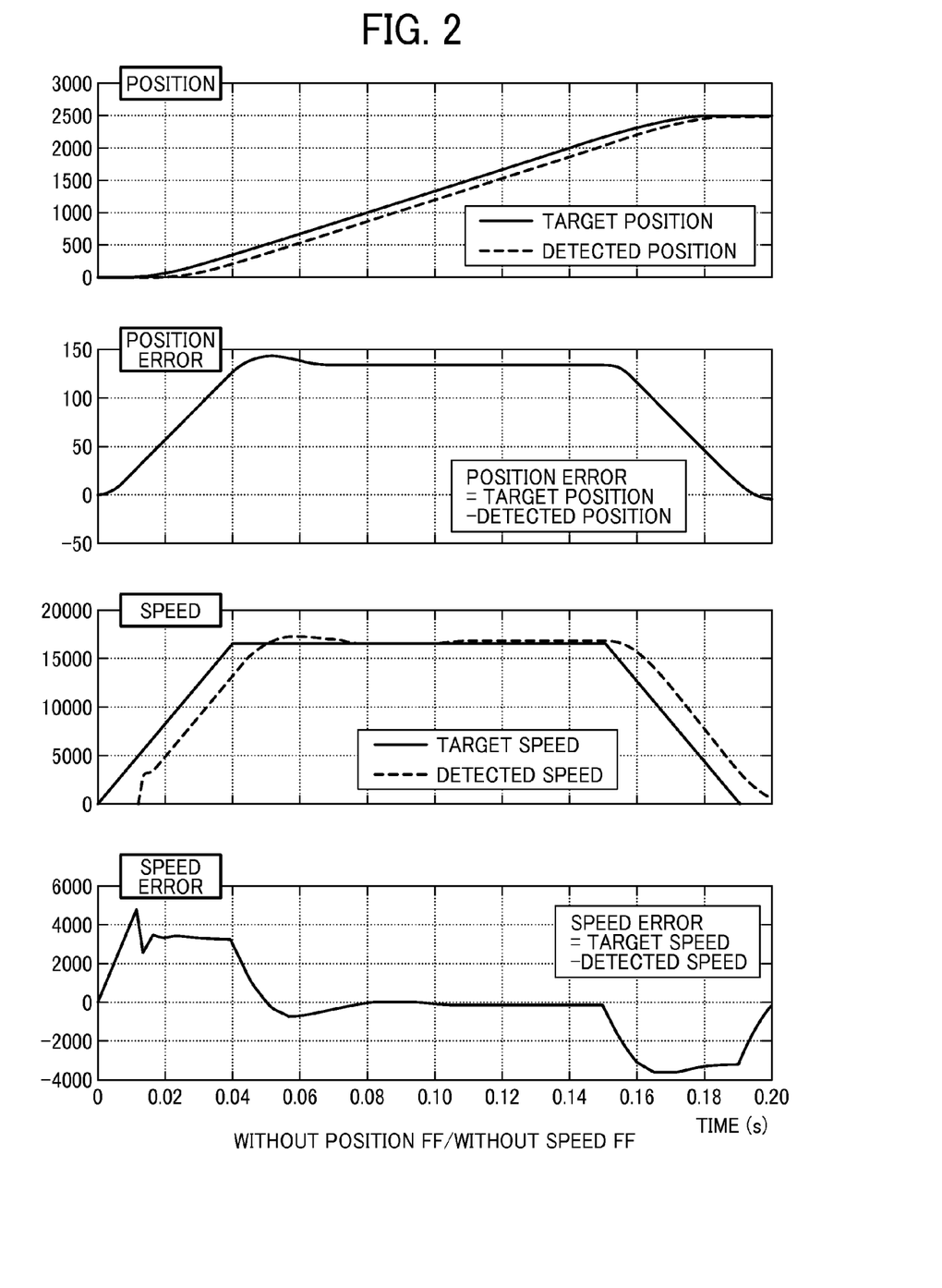
FIG. 2 illustrates experimental results when only position FB information and speed FB information is are added.
Figure 3:
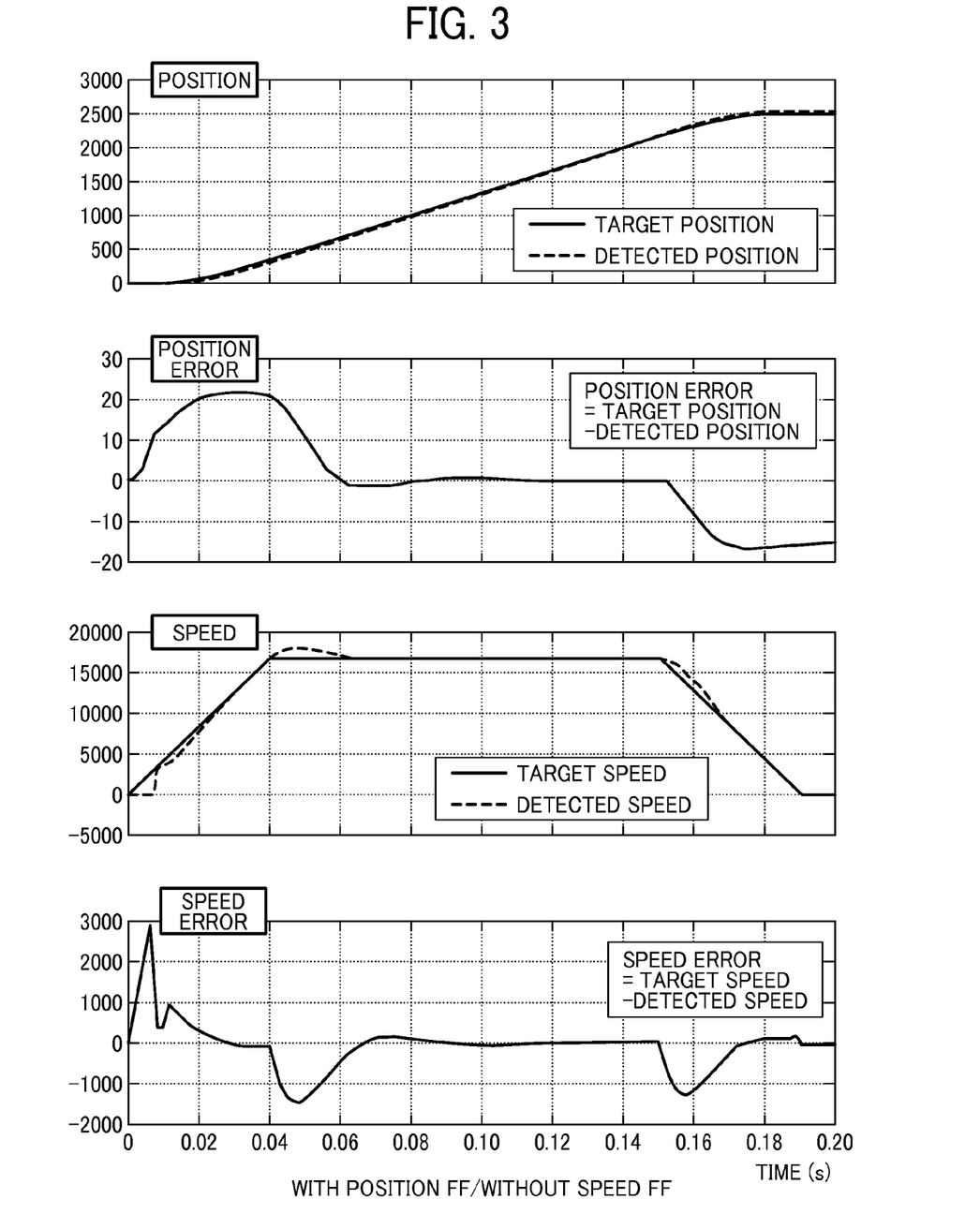
FIG. 3 illustrates experimental results when the position FB information, the position FF information, and speed FB information are added.
Figure 4:
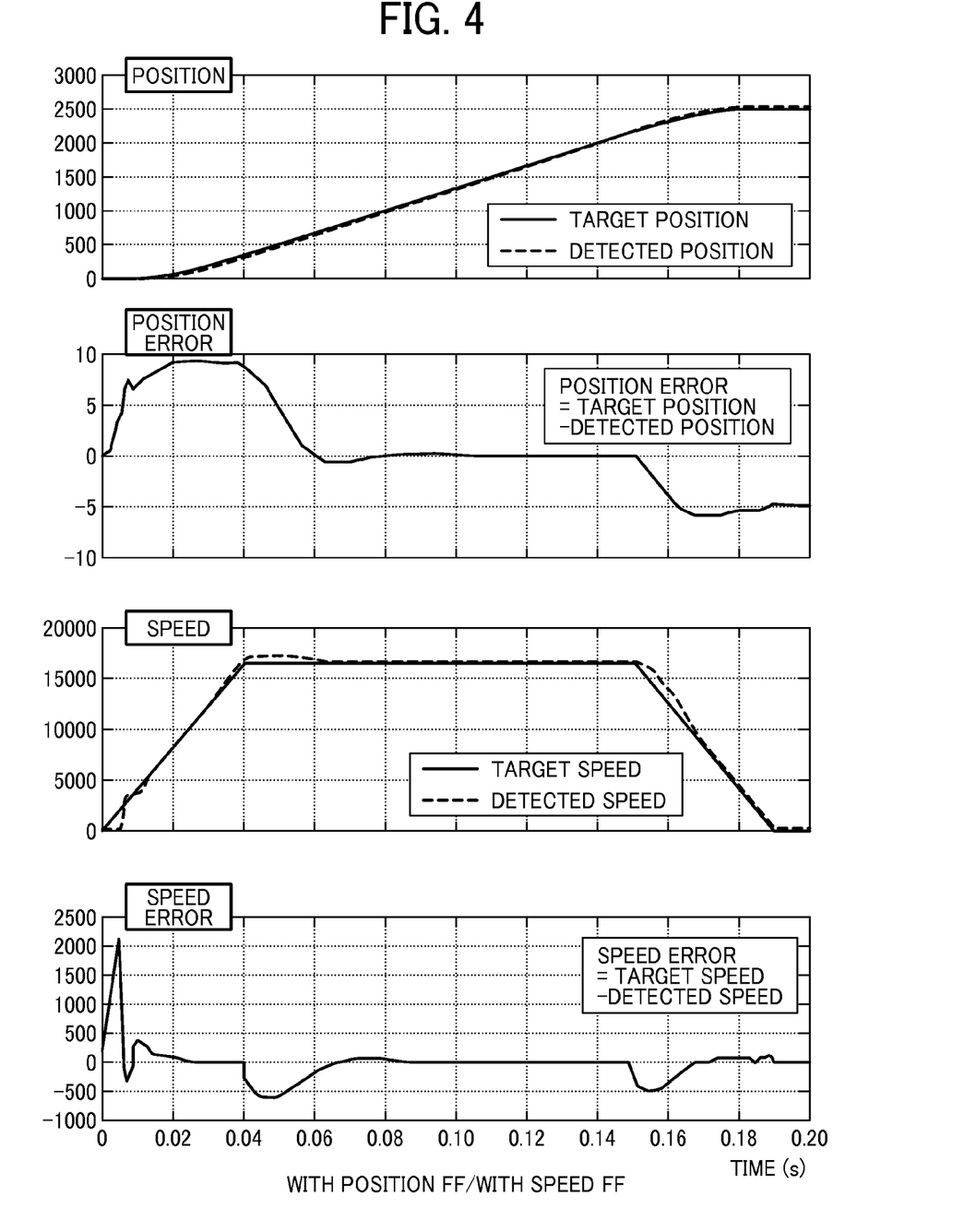
FIG. 4 illustrates experimental results when the position FB information, the position FF information, the speed FB information, and speed FF information are added.

FIGS. 2 through 4 illustrate the experiment results of the position control and the speed control in the motor controller 200. FIG. 2 illustrates experimental results when only the position FB and the speed FB is are added. FIG. 3 illustrates experimental results when the position FB, the position FF, and the speed FB are added. FIG. 4 illustrates experimental results when the position FB, the position FF, the speed FB, and the speed FF are added.

As is clear from FIG. 3, by adding the position FF, when accelerating and decelerating, tracking performance can be improved. Simultaneously, the position tracking performance can be improved. As is further clear from FIG. 4, by adding the speed FF in addition to the position FF, the tracking performance when accelerating and decelerating and the speed tracking performance can be further improved.

The present motor controller 200 in the motor control device 2000 can be installed in various types of devices and apparatuses. Below is described a configuration in which the motor control device 2000 is installed in the image forming apparatus. The image forming apparatus generally includes various types of motor, such as, a feed motor, a scanner motor, and an ADF motor.

Figure 5:
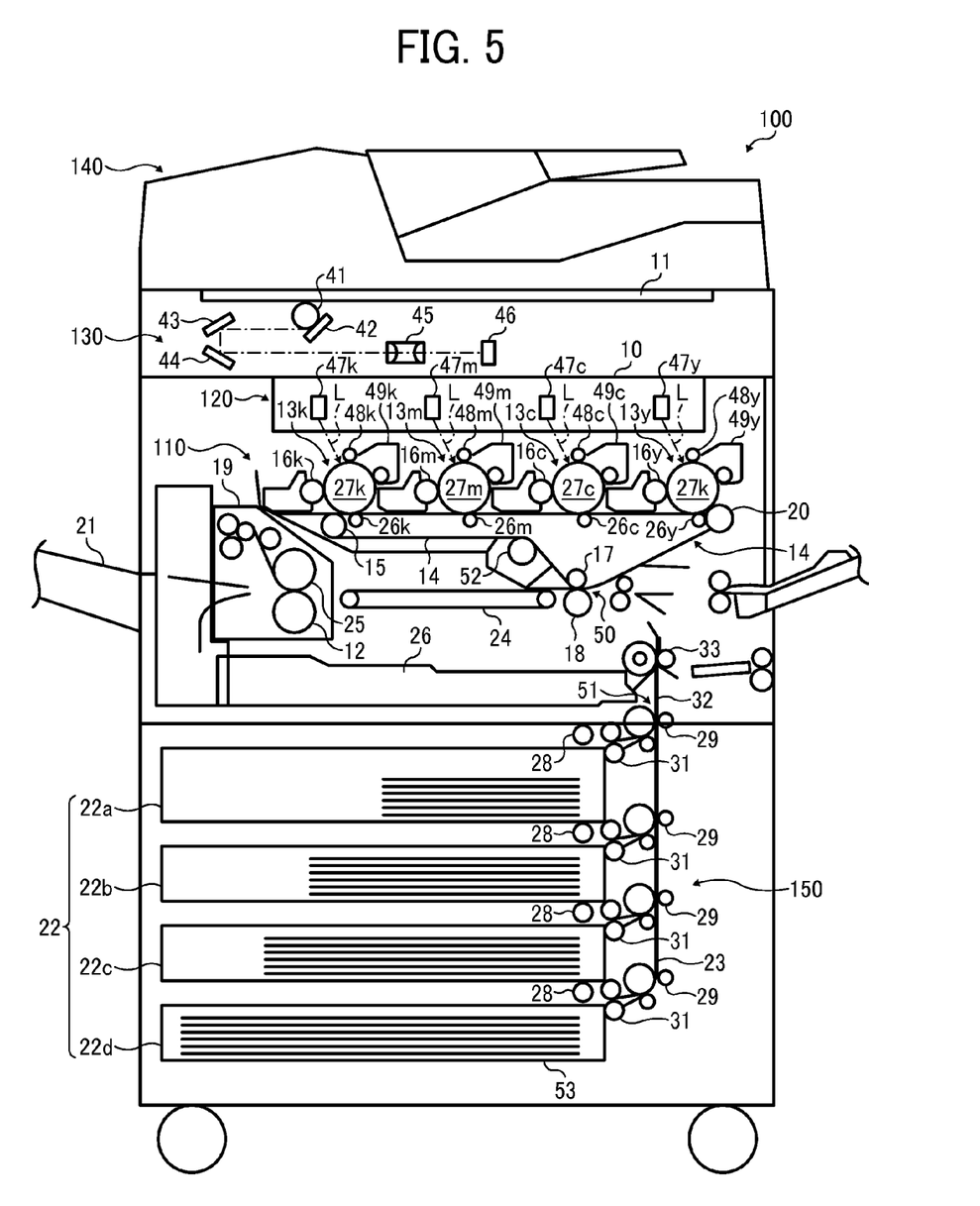
FIG. 5 is an entire configuration diagram illustrating one example of an image forming apparatus installing the motor control device shown in FIG. 1.

FIG. 5 is an entire configuration diagram illustrating one example of an image forming apparatus 100 installing the motor control device 2000 shown in FIG. 1. In FIG. 5, the image forming apparatus 100 includes an automatic document feeder (ADF) 140, an image reading unit 130, an optical writing unit 110, an image forming unit 120, and a sheet feed unit 150.

The ADF 140 includes multiple ADF motors. The ADF 140 transports documents stacked on a document table of the ADF 140 one by one to a contact glass 11 in the image reading unit 130, using the ADF. After image data on the document is read by the image reading unit 130, the ADF 140 discharges the document to a document-discharge tray, using the ADF motor.

The image reading unit 130 includes the contact glass 11 on which the document is read, and an optical scanner system including an exposure lamp 41, a first mirror 42, a second mirror 43, a third mirror 44, a lens 45, and a multiple color charge coupled device (CCD) 46. The image reading unit 130 includes multiple scanner motors. The exposure lamp 41 and the first mirror 42 are installed in a first carriage that is moved in a sub-scanning direction at a constant speed by the scanner motor when the image on the document is read. The second mirror 43 and the third mirror 44 are installed in a second carriage. When the image on the document is read, the second carriage is moved at half speed of the first carriage. With this configuration, by moving the first carriage and the second carriage, an image face of the document is optically scanned. Then, the scanned data is focused on a receiving face of the multicolor CCD 46 by the lens 45, and the focused image is converted photoelectrically.

More specifically, the multiple color CCD (or multiple color line) 46 photoelectrically converts the focused image into respective color image data, containing red color (R), green color (G), and blue color (B). Subsequently, an image processing circuit (not shown) converts the photoelectrically converted image data from analog to digital (A/D conversion), and executes the various image processing (γ correction, color conversion, and image separation, and gradation correction).

When the user selects printing operation and the image forming apparatus 100 is used as a printer, the optical writing unit 110 forms the respective color latent images on photoreceptor drums 27. In FIG. 5, four photoreceptor units 13 for yellow 13y, magenta 13m, cyan 13c, and black 13k are arranged along a transport direction of an intermediate transfer belt 14. The four photoreceptor units 13y, 13m, 13c, and 13k include the photoreceptor drums 27y, 27m, 27c, and 27k as image carriers, chargers 48y, 48m, 48c, and 48k to charge the photoreceptor drums 27y, 27m, 27c, and 27k, exposure devices 47y, 47m, 47c, and 47k, development devices 16y, 16m, 16c, and 16k, and cleaning devices 49y, 49m, 49c, and 49k.

The exposure devices 47y, 47m, 47c, and 47k expose the photoreceptor drums 27y, 27m, 27c, and 27k, using a LED writing mechanism constituted by a light emitting diode (LED) array and a lens array arranged in a shaft direction (main scanning direction) of the photoreceptor drums 27y, 27m, 27c, and 27k. The multiple LED in the exposure devices 47y, 47m, 47c, and 47k emit light in accordance with the photoelectric converted image data for respective colors to form electrostatic latent images on the photoreceptor drums 27y, 27m, 27c, and 27k. In the development devices 16y, 16m, 16c, and 16k, respective development rollers, which carry developer and rotate, visualize the electrostatic latent images on the photoreceptor drums 27y, 27m, 27c, and 27k with the toner, to form the respective color toner images.

The toner images formed on the photoreceptor drums 27y, 27m, 27c, and 27k are transferred onto the intermediate transfer belt 14 at a portion (primary transfer potion) where the photoreceptor drums 27y, 27m, 27c, and 27k face the intermediate transfer belt 14. Intermediate transfer rollers 26y, 26m, 26c, and 26k are disposed facing to the photoreceptor units 13y, 13m, 13c, and 13k via the intermediate transfer belt 14. The intermediate transfer rollers 26y, 26m, 26c, and 26k are disposed in contact with an inner circumferential surface of the intermediate transfer belt 14 so as to contact an outer surface of the intermediate transfer belt 14 with outer surfaces of the photoreceptor drums 27y, 27m, 27c, and 27k.

By applying power supply to the intermediate transfer rollers 26y, 26m, 26c, and 26k, an intermediate transfer electrical field to transfer the toner images on the photoreceptor drums 27y, 27m, 27c, and 27k onto the intermediate transfer belt 14 is formed. Due to the effect of the intermediate transfer electrical field, the toner image is transferred onto the intermediate transfer belt 14. That is, the respective colors of the toner images are superimposed and transferred, and the multiple-color toner image is formed on the intermediate transfer belt 14.

When the image forming process and the primary transfer process on the intermediate transfer belt 14 are finished, a sheet-feed rotor 28 in the sheet feed tray 22 feeds a recording paper 53 to a secondary transfer unit 50. Then, the secondary transfer unit 50 secondary transfers the composite four-color toner image onto the recording paper 53 at one time.

More specifically, the recording paper 53 is selected from a first tray 22a, a second tray 22b, a third tray 22c, or a fourth tray 22d in the sheet feed unit 150, or a sheet-reverse mechanism 26 that inverts the recording paper 53 using a duplex motor constituted by a stepper motor (STM). The each of the sheet-feed tray 22a through 22d includes the sheet-feed roller 28 that sends the top of the recording paper 53 stored therein and a separation roller pair 31 that separates the recording papers 53 sent by the sheet-feed roller 28 one by one and sends the single recording paper 53 to a transport path 23. With this configuration, the recording paper 53 is sent to the transport path 23. A series of the feed rollers 28 and 31 are controlled by multiple sheet-feed motors.

The sheet feed unit 150 further includes multiple transport roller pairs 29 arranged on the way to the transport path 23. The transport roller pairs 29, controlled by the sheet-feed motors (STM), send the recording paper 53 from one of the sheet-feed tray 22 to a downstream transport roller pairs 29, and then to a feeding path 32 of the optical writing unit 110. A registration sensor 51 detects that a leading edge of the recording paper 53 is sent into the feeding path 32. After a predetermined time has elapsed from the detection by the registration sensor 51, a registration roller pair 33 sandwiches the recording paper 53 to stop the recording paper 53 from being further transported. Then, the registration roller pair 33, driven by a registration motor, restarts transporting the sandwiched recording paper 53 to a secondary transfer roller 18, at predetermined timing in sync with a sub-scanning effective period signal (FGATE). The predetermined timing represents the timing when the composite multicolor toner image reaches a position facing the secondary transfer roller 18 by rotating the intermediate transfer belt 14.

The secondary transfer roller 18 is disposed opposite to a repulsive roller 17 via the intermediate transfer belt 14. In the image forming apparatus 100, during image forming operation, the secondary transfer roller 18 is disposed in contact with the intermediate transfer belt 14. The secondary transfer roller 18 is controlled by a secondary transfer motor so that an outer circumferential speed of the secondary transfer roller 18 is equal to a surface speed of the intermediate transfer belt 14.

After the recording paper 53 is separated from the intermediate transfer belt 14 using a separator (not shown), the recording paper 53 is transported to a fixing device 19 by a transport belt 24. The toner image is fixed on the recording paper 53 in place with heat and pressure by rollers 25 and 12 in the fixing device 19.

In a single printing, the recording paper 53 after the fixing process is transported to a discharge tray 21 by a discharge roller (not shown) driven by a discharge motor. Alternatively, in duplex printing to record images on both sides of the recording paper 53, after the recording paper 53 on which the image is formed on one face is transported from the fixing device 19 to a sheet reverse mechanism 26, the sheet reverse mechanism 26 switches back to reverse upside down, and then transports to the registration roller pair 33, using the duplex motor.

Although FIG. 5 illustrates the image forming apparatus to form the image on the recording paper 53 using electrophotographic method, alternatively, in image forming apparatuses using ink ejecting method to eject ink liquid, a dye sublimation transfer method, or dot impact method, various types of motors are used.

Figure 6:
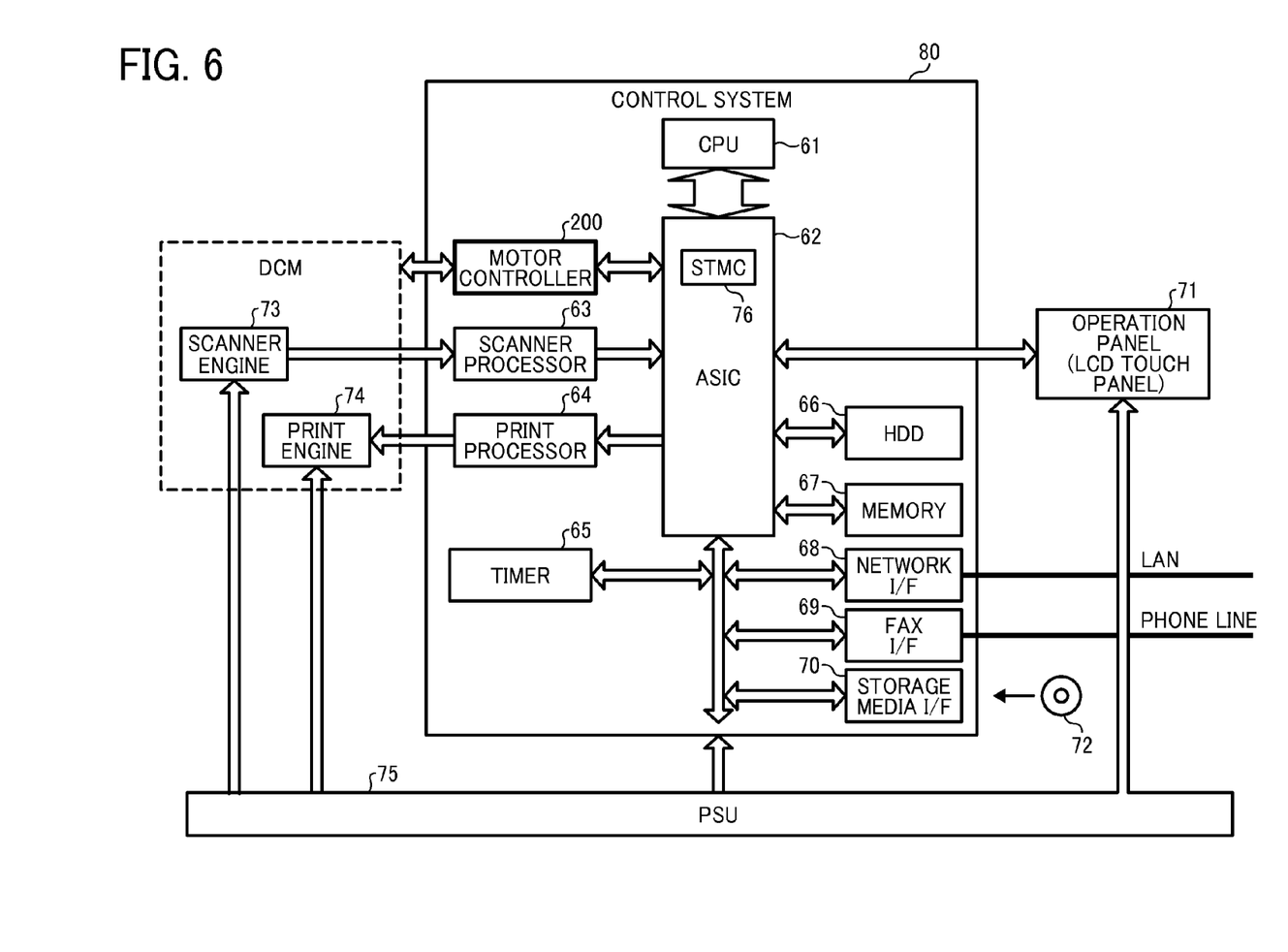
FIG. 6 is a hardware configuration diagram illustrating the image forming apparatus shown in FIG. 5.

FIG. 6 is a hardware configuration diagram illustrating the image forming apparatus 100. The image forming apparatus 100 is, for example, a multifunction peripheral (Multifunction peripheral) including multiple function of printer, facsimile, copier, scanner, and a multifunction peripheral (Multifunction peripheral) including these multiple functions.

The image forming apparatus 100 includes a control system 80, a scanner engine 73, a print engine 74, a power supply unit (PSU) 75, and an operational panel 71. The control system 80 includes the motor controller 200, a main central processing unit (CPU) 61, an application specific integrated circuit (ASIC) 62, a scanner processor 63, a timer 65, a hard disk drive (HDD) 66, a memory 67, a network interface (I/F) 68, and a facsimile (FAX) I/F 69, and all elements in the control system 80 are connected respectively by a bus.

The operational penal 71 integrally includes a liquid crystal display (LCD) and a touch panel. A junction key, a start button, a reset button, and an application switching button are generally provided close to the operational panel 71. The scanner engine 73 is a reading unit to optically read the document, which corresponds to the image reading unit 130 shown in FIG. 5. The print engine 74 is a printing unit to print the image on sheet (recording paper 53), which corresponds to the optical writing unit 110, the image forming unit 120, and the sheet feed unit 150.

The main CPU 61 controls the overall operation of the image forming apparatus 100. The ASIC 62 is a large-scale integration (LSI) circuit used for image processing to provide various types of image processing needed for the scanner process and the print process. The DC motor 400 is the genetic term of the sheet-feed motor, the registration motor, the scanner motor, the duplex motor, and peripheral motor (e.g., ADF motor, finisher), which are controlled by the motor control device 2000.

The ASIC 62 may install a stepper motor controller (STMC) 76 that had controlled the stepper motor before the motor was replaced from the stepper motor to the DC motor (to be described in a second embodiment). Since the STMC 76 is integrally formed with the ASIC 62, replacing the controller from the STMC 76 to a DC motor controller (DCMC) is not easy even though the stepper motor (STM) is replaced to the DC motor (DCM). However, installing a motor control device 2000-2 (see FIG. 10) in the control system 80, the STMC 76 can control the DCM, instead of the STM.

The memory 67 stores various application executed by the CPU 61 and various data when the application is executed. In addition, the HDD 66 is a non-volatile memory to store the image data, the various programs, font data, and various files. A solid state drive (SSD) can be mounted in a part of or all of the HDD 66.

Herein, the network I/F 68 is connected to local area network (LAN). The network I/F 68 is, for example, network interface card (NIC), which attain communication between the image forming apparatus 100 and a server, using a predetermined protocol. The FAX I/F 69 is connected to a telephone line. The FAX I/F 69 decompresses facsimile data from the telephone line. While FAX application is activated, the FAX I/F 69 modulates the image data read by the scanner engine 73 for facsimile style for output to telephone line. The PSU 75 controls the supply of the power to the control system 80, the operational panel 71, the scanner engine 73, and the print engine 74.

Figure 7:
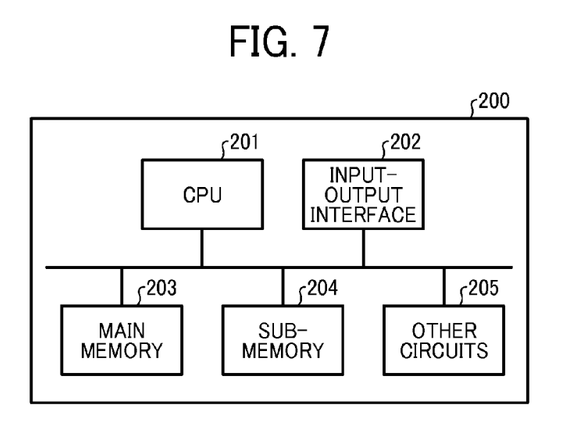
FIG. 7 is a hardware configuration diagram illustrating the motor control device shown in FIG. 1.

FIG. 7 is a one example of the hardware configuration of the motor controller 200. The motor controller 200, constituted by a microcomputer or integrated circuit (IC), includes internals elements of a CPU 201, an input-output interface 202, a main storage device 203, a sub-storage device (memory) 204 and the other circuit 205, and the internal elements in the motor controller 200 are connected respectively via the bus.

The operation process executed in the motor controller 200 is partly constituted by a hardware-functional other circuit 205, and other thereof is constituted by a software process. The software process is provided by executing the programs stored in the sub-storage device 204 by the CPU 210.

The programs are stored in advance in the sub-storage device 204 as embedded system when the image forming apparatus 100 is shipped. Alternatively, the programs may be provided by distributing a storage medium 72 in a state in which the programs are stored in the storage medium 72, and programs read by a storage medium I/F 70 may be transmitted from the ASIC 62 to the sub-storage device 204, in the motor control device 2000. Yet alternatively, the program may be distributed by downloading from a server (not shown).

The main storage device 203 is a work memory formed by random access memory (RAM). The sub-storage device 204 is, for example, a read only memory (ROM) formed by a flash memory. The sub-storage device 204 stores the programs executed by the CPU 201, and needed table and data. The input-output interface 202 is an I/O port to receive input of a pulse rate signal (or a profile data) from the STMC 76 and an encoder pulse, and to output the pulse width modulation (PWM) signal and other signal (e.g., rotary direction) to the motor drive circuit 300.

Next, specific configuration and operation of the motor control device 2000 including two embodiments are described below.

First Embodiment

Figure 8:
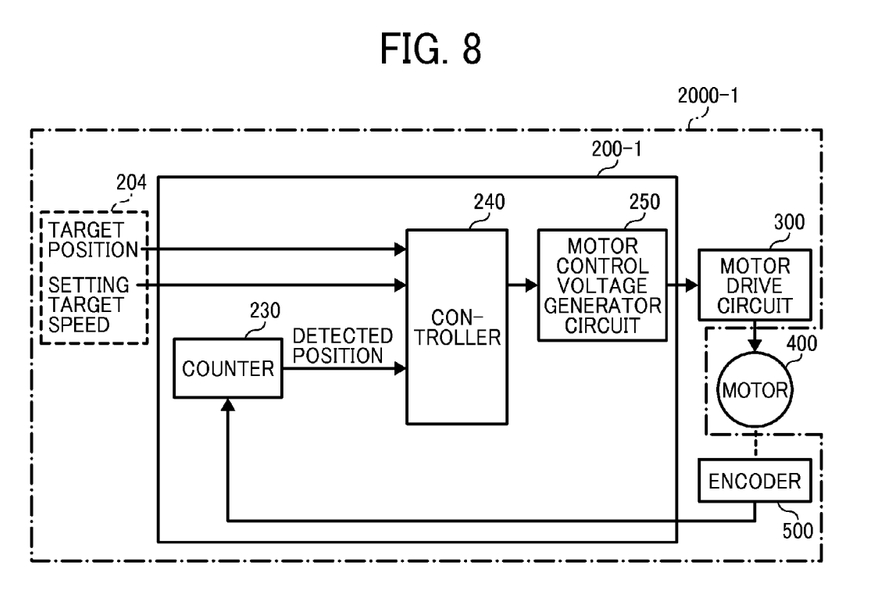
FIG. 8 is a block diagram of a motor control device according to a first embodiment of the present disclosure.

In a first embodiment, the target position and the setting target speed are provided by a table. It is to be noted that the table providing the target position and the setting target speed is stored in the sub-memory 204 with programs. The motor control device 2000 includes the sub-memory 240 containing table functions as a target position information provider and a target speed information provider.

FIG. 8 is a block diagram illustrating a motor controller 200-1 in a motor control device 2000-1 according to the first embodiment. The motor control device 2000-1 functionally includes the sub-memory 204, the motor driver circuit 300, and the encoder 500, in addition to the motor controller 200-1.

In FIG. 8, the motor controller 200-1 includes a counter 230, the controller (processor) 240, and the motor control voltage generator circuit 250(9), as software or hardware function. For example, the counter 230 and the motor control voltage generator circuit 250 are implemented as the hardware structure, and the controller 240 is implemented as a software structure. It is to be noted that the counter 230 and the motor control voltage generator circuit 250 may be implemented as the software structure.

The encoder 500, serving as a pulse generator, is attached to the motor (DC motor) 400 (e.g., sheet-feed motor, registration motor, scanner motor, duplex motor, and ADF motor, etc.,). As the encoder 500 is rotated in sync with the motor 400, the encoder 500 outputs an encoder signal (pulse signal). In general, the encoder signal is formed by two phases, and the encoder 500 detects the rotation direction of the motor 400, but the description of the rotation direction is omitted. Alternatively, the encoder 500 may be attached to a roller as a controlled object of the motor 400.

The encoder signal output from the encoder 500 is input to the counter 230, and the counter 230 counts rising edges of the encoder signal. The count value of the counter 230 represents the detected position information (rotary angle information) of the motor 400. Herein, the encoder 500 and the counter 230 together function as a detected position information detector. The target position information and the setting target speed information of the motor 400 are given by the table stored in the sub-memory (memory) 204.

The controller 240 corresponds to the portion surrounded by the broken line shown in FIG. 1. The detected position information, the target position information, and the setting target speed information of the motor 400 are input to the controller 240, and the controller 240 adds the position FB, the position FF, the speed FB, and the speed FF, for output as the motor control information.

More specifically, the controller 240 calculates a difference value between the target position information and the detected position information and multiplies the difference by a constant value (gain) to generate the position FB information.

Further, the controller 240 differentiates the target position information to generate the position FF information. Then, the controller 240 differentiates the detected position information to generate the detected speed information. The controller 240 adds the position FB information and the position FF information to generate the calculated target speed information. The controller 240 calculates difference between the calculated target speed information and the detected speed information, and operates PID calculation to the difference to generate the speed FB information.

The controller 240 differentiates the setting target speed information of the motor 400 given by the table to generate the speed FF information, and finally adds the speed FB information and the speed FF information for output as the motor control information.

The calculation operation in the controller 240 is implemented by executing programs stored in the CPU 201 (software control). Alternatively, the calculation operation in the controller 240 may be implemented by the hardwired logic.

The motor control information output from the controller 240 is input to the motor control voltage generator circuit 250, and the motor control voltage generator circuit 250 generates the control voltage to drive the motor 400 in accordance with the motor control information. More specifically, the motor control voltage generator circuit 250 generates a PWM signal whose duty ratio is changed in accordance with the motor control information, as the control voltage. For example, when the motor control information is great at the positive side, the actual position of the motor 400 is late, and therefore, the duty ratio of the PWM signal is set greater. Conversely, when the motor control information is great at the negative side, the actual position is early, and therefore, the duty ratio of the PWM signal is set smaller. The speed component is similar to above.

The motor drive circuit 300, constituted by, for example, H bridge circuit, receives the PWM signal from the motor control voltage generator circuit 250, and switches a predetermined transistor in the H bridge circuit on and off to control the rotation of the motor 400.

The configuration of motor control voltage generator circuit 250 and the motor drive circuit 300 are known techniques, specific description is omitted.

Figure 9:
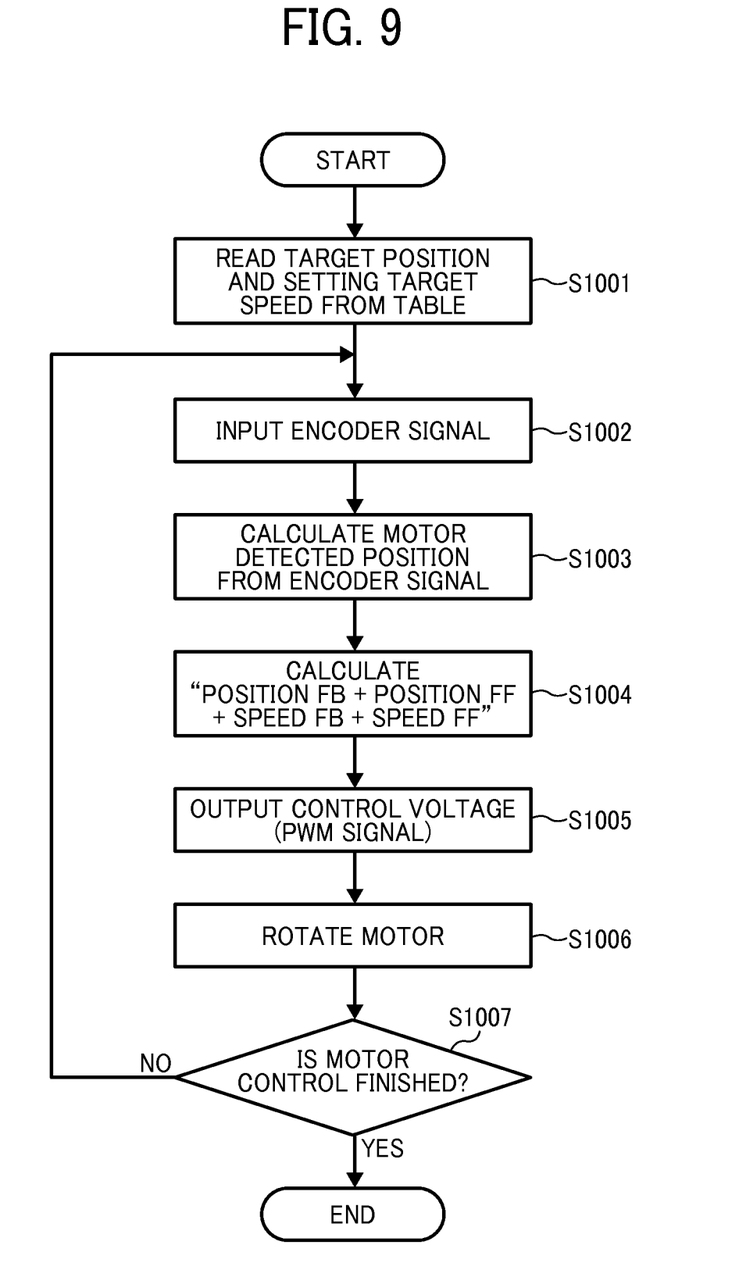
FIG. 9 is a flow chart illustrating motor control by the motor control device shown in FIG. 8.

FIG. 9 is a flow chart illustrating the motor control by the motor control device 2000-1 shown in FIG. 8. When the motor 400 is rotated, the controller 240 reads the target position information and the setting target speed information from the table stored in the memory 204 at step S1001. The encoder signal from the encoder 500 is input to the counter 230 at step 1002. At step S1003, the counter 230 counts the encoder signal for output as the detected position signal of the motor 400. The initial value of the detected position information is 0.

The target position information and the setting target speed information read in the table and the detected position information read in the counter 230 are input to the controller 240, and the controller 240 adds the position FB, the position FF, the speed FB, and the speed FF for output as the motor control information at step S1004. The motor control voltage generator circuit 250 generates the PWM signal as the control voltage to drive the motor 400 in accordance with the motor control information at step S1005. The motor drive circuit 300 receives the PWM signal from the motor control voltage generator circuit 250 and controls rotation of the motor 400 at step S1006.

Subsequently, the operation at steps S1002 through S1006 is repeated until the motor control is finished at step S1007. During this period, adding the position FB, the position FF, the speed FB, and the speed FF at step S1004 is kept at 20 kHz until the motor 400 is stopped.

Second Embodiment

In a second embodiment, the target position is provided by a pulse rate signal. In general, although the stepper motor has been used in the image forming apparatus, recently, the stepper motor tends to be replaced by the direct current (DC) motor. However, since the driving method of the DC motor differs from that of the stepper motor, if only the motor portion for the DC motor is used instead of that for the stepper motor, the rotation of the DC motor is not properly controlled. Therefore, it is necessary to replace not only the motor portion but also the driver and the control IC, resulting in a cost increase. In addition, when the control IC is incorporated with another control circuit in an application specific integrated circuit (ASIC) (corresponding to STMC 76 shown in FIG. 6), redesigning an expensive ASIC only for the control IC of the stepper motor may be impractical.

In order to solve this problem, JP-2011-114951-A proposes an approach in which, using the control IC for stepper motor, the control signal for the stepper motor is converted into the control signal of the DC motor, and such description is incorporated herein. The present embodiment presupposes this type of the motor control device.

Figure 10:
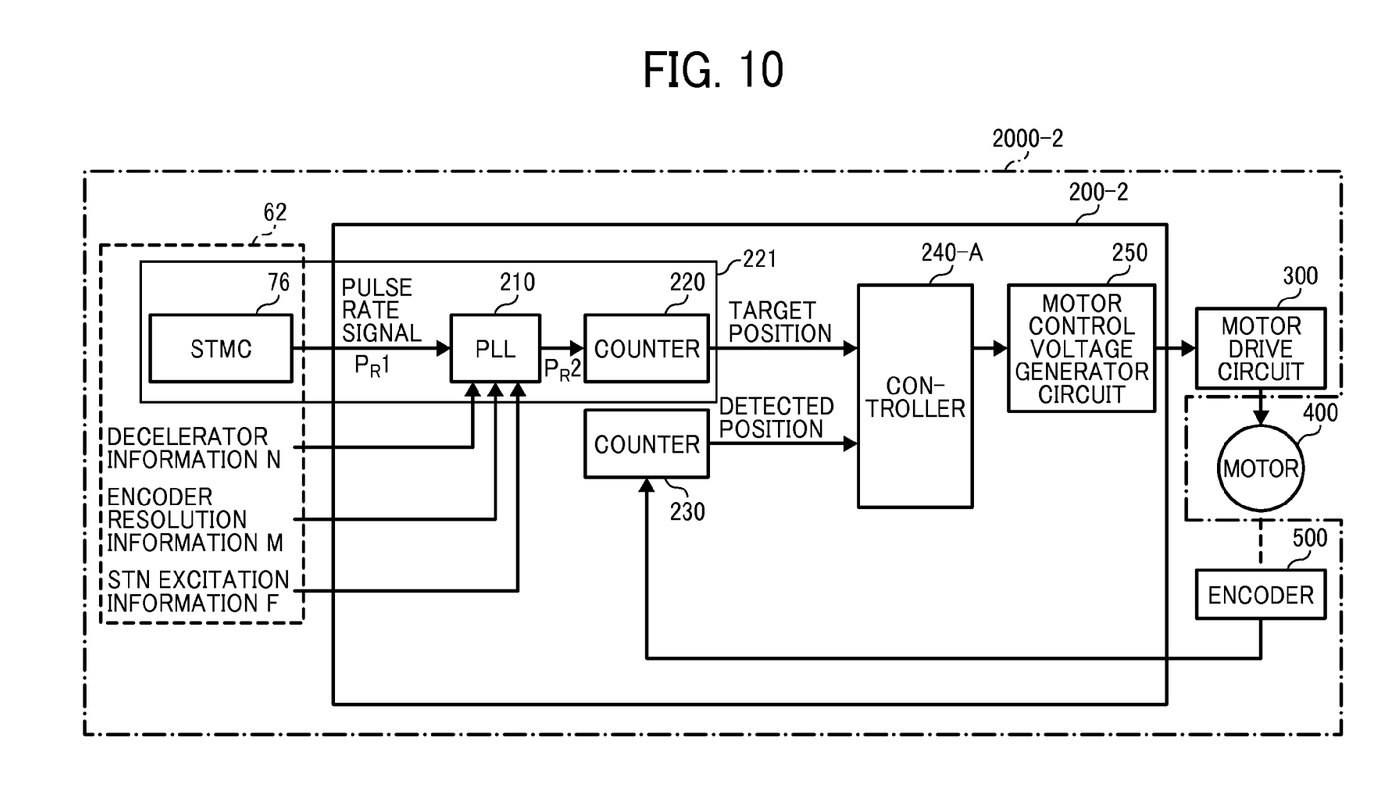
FIG. 10 is a block diagram of a motor control device according to a second embodiment of the present disclosure.

FIG. 10 is a block diagram of the motor control device 2000-2 according to the second embodiment. The motor control device 2000-2 functionally includes the ASIC 62, the motor driver circuit 300, and the encoder 500, in addition to the motor controller 200-2.

In FIG. 10, the motor controller 200-2 includes a phase-locked loop (PLL) circuit 210, a counter 220, the counter 230, a controller (processor) 240-A, and the motor control voltage generator circuit 250, as a hardware or software function. For example, the controller 240-A is implemented as software structure and the other portion is implemented as the hardware structure; however, all functions can be implemented as software.

The encoder 500, serving as a pulse generator, is attached to the motor (DC motor) 400. As the encoder 500 is rotated in sync with the motor 400, the encoder 500 outputs the encoder signal (pulse signal). As described above, in general, the encoder signal is composed by two phases, the rotation direction of the motor 400 can be detected, and however, the description in the rotation direction is omitted. Alternatively, the encoder 500 may be attached to the roller as a controlled object of the motor 400.

The stepper motor controller (STMC) 76 is designed in advance in hardware and the software point, and the setting of STMC 76 is treated as a thing that never changes. The STMC 76, serving as a first pulse rate signal generator, treats a control target motor as a stepper motor to generate and output a pulse rate signal (first pulse rate signal) $P_R1$ for rotational control. The pulse rate signal $P_R1$ is a S™ driving pulse when the motor 400 is constituted by the stepper motor (STM). The frequency of the pulse rate signal $P_R1$ corresponds to the rotation velocity of the STM, and the pulse number of the pulse rate signal $P_R1$ corresponds to the position information of the STM.

The pulse rate signal $P_R1$ output from the STMC 76, and decelerator information (gear rate information) N, encoder resolution information M, and STM excitation information F are input to the PLL circuit 210 of the motor controller 200-2. The PLL circuit 210, serving as a second pulse rate signal generator, converts the first pulse rate signal $P_R1$ into a second pulse rate signal $P_R2$ for the connected DC motor by multiplying the frequency of the input pulse rate signal $P_R1$ by a value based on the decelerator information N, the encoder resolution information M, and the STM excitation information F for output as a multiplied pulse rate signal (second pulse rate signal) $P_R2$. That is, the frequency of the pulse rate signal $P_R2$ output from the PLL circuit 210 indicates target speed (setting target speed) of the motor (DC motor) 400, and the pulse number thereof indicates the target position (rotary angle) of the DC motor 400. Herein, the STMC 76, the PLL circuit 210, and the counter 220 together function as a target position information provider 221. It is to be noted that, since the decelerator information (gear rate information) N, the encoder resolution information M, and the STM excitation information F, and the operation of the PLL circuit 210 are disclosed in JP-2011-114951-A, a specific description thereof is omitted.

The PLL circuit 210 in the motor controller 200-2 acquires the decelerator information (gear rate information) N, the encoder resolution information M, and the STM excitation information F from the ASIC 62.

Alternatively, if the excitation information F, the encoder resolution information M, and the gear rate information N are fixed because the excitation method is a fixed method, the motor controller 200-2 can read out the decelerator information (gear rate information) N, the encoder resolution information M, and the STM excitation information F from the sub-storage device 204.

Yet alternatively, the PLL circuit 210 in the motor controller 200-2 may acquire the STM excitation information F and the encoder resolution information M from the ASIC 62 and acquire the gear ratio information N from the sub-storage device 204.

The pulse rate signal $P_R2$ from the PLL circuit 210 is input to the counter 220, and the counter 220 counts rising edges of the pulse rate signal $P_R2$. The count value indicates the target position information to drive the motor 400.

The encoder signal from the encoder 500 is input to the counter 230, and the counter 230 counts the rising edges of the encoder signal. The count value of the counter 230 indicates the detected position information (rotary angle information) of the motor 400. Herein, the encoder 500 and the counter 230 together function as a detected position information detector.

The controller 240-A represents the portion surrounded by the broken line shown in FIG. 1. In this embodiment, the target position information of the motor 400 counted in the counter 220 and the detected position information of the motor 400 counted in the counter 230 are input to the controller 240-A, and the controller 240-A adds the position FB, the position FF, and the speed FB for output as the motor control information.

More specifically, the controller 240-A calculates the difference between the target position information and the detected position information, and multiplies the difference by a constant value to generate the position FB information. Further, the controller 240-A differentiates the target position information to generate the position FF information. Then, the controller 240-A differentiates the detected position information to generate the detected speed information. The controller 240-A adds the position FB information and the position FF information to generate the calculated target speed information. The controller 240-A calculates the difference between the calculated target speed information and the detected speed information, and finally operates PID calculation to the difference as the speed FB information.

The controller 240-A outputs the speed FB information as the motor control information. In the second embodiment, the process of calculating the speed FF information is not executed.

The motor control information output from the controller 240-A is input to the motor control voltage generator circuit 250, and the motor control voltage generator circuit 250 generates the PWM signal whose duty ratio is changed in accordance with the motor control information, as the control voltage to drive the DC motor 400.

The motor drive circuit 300, constituted by, for example H bridge circuit, receives the PWM signal from the motor control voltage generator circuit 250, and switches a predetermined transistor in the H bridge circuit on and off to control the rotation of the motor 400.

Figure 11:
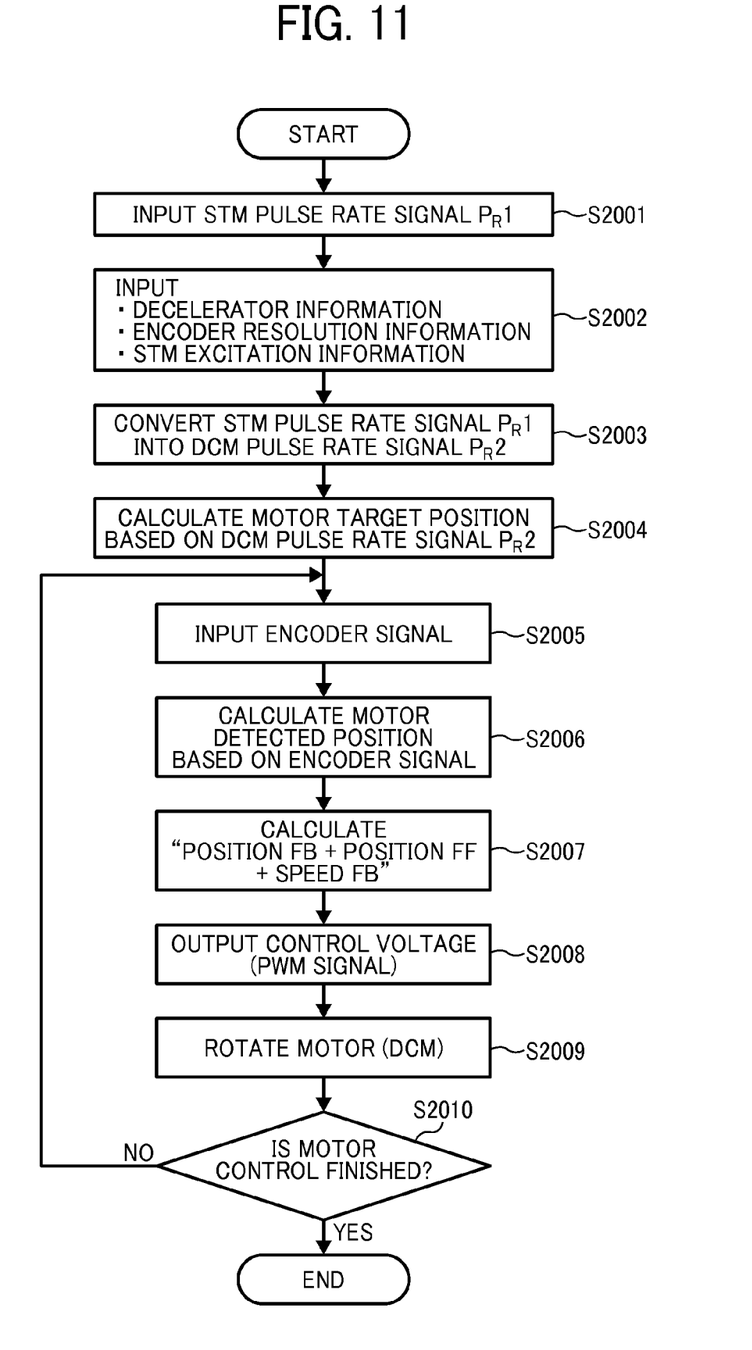
FIG. 11 is a flow chart illustrating motor control by the motor control drive device shown in FIG. 10.

FIG. 11 is a flow chart illustrating a motor control by the motor control drive device 2000-2 shown in FIG. 10. When the motor (DC motor) 400 is rotated, the stepper motor controller (STMC) 76 generates the first pulse rate signal $P_R1$ for the stepper motor (STM) for outputting to the PLL circuit 210 at step S2001. Then, the decelerator information (gear rate information) N, the encoder resolution information M, and the STM excitation information F, stored in the ASIC 62 or the sub-storage memory 204, are input to the PLL circuit 210 at step S2002. The PLL circuit 210 converts the STM pulse rate signal $P_R1$ into the DCM pulse rate signal $P_R2$ by multiplying the frequency of the pulse rate signal $P_R1$ for the STM by the value based on the decelerator information N, the encoder resolution information M, and the STM excitation information F, for outputting the second pulse rate signal $P_R2$ for the DC motor (DCM) at step S2003. The counter 220 counts the DCM pulse rate signal $P_R2$ output from the PLL circuit 210 for output as the target position information of the DC motor 400 at step S2004.

At this time, the encoder signal from the encoder 500 is input to the counter 230 at step S2005. The counter 230 counts the encoder signal for output as the detected position information of the motor 400 at step S2006. The initial value of the detected position information is 0.

At step S2007, the target position information from the counter 220 and the detected position information from the counter 230 are input to the controller 240-A, and the controller 240-A adds the speed FB, the position FF, and the speed FB for output as the motor control information. The motor control voltage generator circuit 250 generates the PWM signal as the control voltage to drive the motor 400 in accordance with the motor control information at step S2008. The motor drive circuit 300 receives the PWM signal from the motor control voltage generator circuit 250 and controls rotation of the motor 400 at step S2009.

Subsequently, the operation at steps S2005 through S2009 is repeated until the motor control is finished at step S2010. During this period, adding the position FB, the position FF, and the speed FB at step S2007 is kept at 20 kHz until the motor 400 is stopped.

It is to be noted that, in the first and the second embodiments, the encoder 500 is used as the detected position information detector; however, the configuration of the detected position information detector is not limited to above. As for the detected position detector, for example, a DC brushless motor includes multiple Hall elements to detect the polarity of the rotor as a position detector of the motor. By inputting the detected signal of the Hall elements and counting the detected signal, the detected position information of the motor can be acquired.

Alternatively, providing a magnetic pattern in external periphery of the rotor, a magnetic sensor detects the magnetic pattern for output as a detected signal (FG signal), and a counter counts the FG signal, which can acquire the detected position information of the motor.

Yet alternatively, by detected the rotary speed (rotary velocity) of the motor, and differentiating the detected rotary speed, the detected position information of the motor can be acquired.

Numerous additional modifications and variations are possible in light of the above teachings. It is therefore to be understood that, within the scope of the appended claims, the disclosure of this patent specification may be practiced otherwise than as specifically described herein.

What is claimed is:

1. A motor control device to output a motor control signal in accordance with a rotational position of a motor, the motor control device comprising:
    a processor configured to,
        receive detected position information, target position information and set target speed information,
        generate position feedback information based on the detected position information and the target position information,
        generate speed feedback information based on the position feedback information, position feed-forward information obtained from the target position information, and detected speed information obtained from the detected position information,
        generate motor control information based on the speed feedback information and speed feed-forward information, the speed feed-forward information obtained from the set target speed information, and
        output the motor control signal based on the motor control information.

2. The motor control device according to claim 1, wherein the processor is configured to:
    generate the position feedback information by differentiating the target position information
    generate the detected speed information by differentiating the detected position information;
    generate the speed feed-forward information by differentiating the set target speed information; and
    generate the motor control information by adding the speed feedback information and the speed feed-forward information.

3. The motor control device according to claim 1, further comprising:
    a memory containing a table that gives the target position information of the motor and the set target speed information of the motor.

4. The motor control device according to claim 1, wherein the processor is configured to receive the detected position information from a detected position information detector, the detected position information detector comprising:
    a pulse generator to generate pulse signals in accordance with the motor; and
    a counter to count the pulse signals from the pulse generator and set a count value as the detected position information.

5. An image forming apparatus including the motor control device of claim 1.

6. The motor control device according to claim 1, wherein the detected position information is an encoder signal generated by an encoder, an
    the encoder attached to the motor or a roller driven by the motor.

7. The motor control device according to claim 1, wherein the detected position information is a hall signal output by hall elements associated with the motor.

8. The motor control device according to claim 1, wherein the detected position information is a signal output by a magnetic sensor associated with the motor.

9. The motor control device according to claim 1, wherein the motor control signal is a pulse width modulation (PWM) signal.

10. A transport device comprising:
    the motor control device of claim 1;
    the motor; and
    a media transporter.

11. A control method employing a motor control device that executes speed control and position control of a motor simultaneously, the method comprising:
    receive detected position information, target position information and set target speed information,
    generating position feedback information based on the detected position information and the target position information;
    generating speed feedback information based on the position feedback information, position feed-forward information obtained from the target position information, and detected speed information obtained from the detected position information; and
    generating motor control information based on the speed feedback information and the speed feed-forward information, the speed feed-forward information obtained from the set target speed information.

12. The motor control device of claim 1, wherein the motor control information is used to control rotation of the motor.

13. The motor control device of claim 1, wherein the processor is configured to,
  determine the speed feedback information based on a sum of the position feed-forward information, the position feedback information, and detected speed information, and
  generate the motor control information based on the speed feedback information and the speed feed-forward information.

14. The motor control device of claim 1, wherein
  the detected position information represents a number of pulses in an encoder signal generated by an encoder associated with the motor, and
  the processor is configured to receive the target position information by one of reading the target position information from a memory and generating the target position information from a pulse rate signal, the pulse rate signal being output by a stepper motor controller, and
  the processor is configured to generate the position feedback information such that the position feedback information represents a difference between the detected position information and the target position information.

15. The method of claim 11, wherein the motor control information is used to control rotation of the motor.

16. The method of claim 11, further comprising:
  determining the speed feedback information based on a sum of the position feed-forward information, the position feedback information, and detected speed information, and
  generating the motor control information based on the speed feedback information and the speed feed-forward information.

17. The method of claim 11, wherein
  the detected position information represents a number of pulses in an encoder signal generated by an encoder associated with the motor, and
  the receiving receives the target position information by one of reading the target position information from a memory and generating the target position information from a pulse rate signal, the pulse rate signal being output by a stepper motor controller, and
  the generating the position feedback information generates the position feedback information such that the position feedback information represents a difference between the detected position information and the target position information.

18. A non-transitory recording medium comprising computer readable code that, when executed by a motor control device, configures the motor control device to:
  receive detected position information, target position information and set target speed information,
  generate position feedback information based on the detected position information and the target position information,
  generate speed feedback information based on the position feedback information, position feed-forward information obtained from the target position information, and detected speed information obtained from the detected position information,
  generate motor control information based on the speed feedback information and speed feed-forward information, the speed feed-forward information obtained from the set target speed information, and
  output the motor control signal based on the motor control information.

* * * * *